United States Patent
Mann et al.

(10) Patent No.: US 10,220,571 B2
(45) Date of Patent: Mar. 5, 2019

(54) METHOD FOR THE MANUFACTURE OF A PLUG-IN CONNECTOR, AND PLUG-IN CONNECTOR

(71) Applicant: NORMA Germany GmbH, Maintal (DE)

(72) Inventors: Stephan Mann, Biebergemünd (DE); Viktor Stoll, Großkrotzenburg (DE); Christoph Steinkamp, Biebergemünd (DE)

(73) Assignee: NORMA Germany GmbH, Maintal (DE)

( * ) Notice: Subject to any disclaimer, the term of this patent is extended or adjusted under 35 U.S.C. 154(b) by 685 days.

(21) Appl. No.: 14/684,038

(22) Filed: Apr. 10, 2015

(65) Prior Publication Data
US 2015/0292664 A1 Oct. 15, 2015

(30) Foreign Application Priority Data
Apr. 11, 2014 (DE) .................. 10 2014 105 165

(51) Int. Cl.
*B23K 20/12* (2006.01)
*B29C 65/10* (2006.01)
(Continued)

(52) U.S. Cl.
CPC ............ *B29C 65/10* (2013.01); *B23K 20/002* (2013.01); *B23K 20/10* (2013.01); *B23K 20/129* (2013.01);
(Continued)

(58) Field of Classification Search
CPC ... B29C 65/10; B29C 66/5223; B29C 66/543; B29C 66/52231; B29C 66/1248;
(Continued)

(56) References Cited

U.S. PATENT DOCUMENTS

| 1,804,954 A * | 5/1931 | Rutherford .......... H02G 3/0608 138/157 |
| 2,293,239 A * | 8/1942 | Jacques ................ B64D 27/04 403/173 |

(Continued)

FOREIGN PATENT DOCUMENTS

| DE | 811765 C1 | 8/1951 |
| DE | 2503376 A1 | 7/1976 |

(Continued)

OTHER PUBLICATIONS

Machine translation of JP-2007-155031A (no date available).*

(Continued)

*Primary Examiner* — Kiley S Stoner
(74) *Attorney, Agent, or Firm* — SoCal IP Law Group LLP; John E. Gunther

(57) ABSTRACT

The invention relates to a method for producing a plug-in connector, and to a plug-in connector comprising a first tubular component and a second tubular component, and also a first connection geometry and a second connection geometry. A method for producing a plug-in connector is to be made available that permits an easier modification of the relative angle between the longitudinal axes of the two components in the finished plug-in connector. To this end, the two connection geometries are arranged in a connection plane inclined with respect to the longitudinal axes, such that the relative angle between the longitudinal axes can be modified by rotating the components. After a relative angle has been selected, the two connection geometries are connected by integral bonding.

7 Claims, 11 Drawing Sheets

(51) Int. Cl.
  *B23K 26/20* (2014.01)
  *B23K 20/10* (2006.01)
  *B23K 20/00* (2006.01)
  *F16L 27/08* (2006.01)
  *F16L 37/098* (2006.01)
  *F16L 47/02* (2006.01)
  *F16L 47/18* (2006.01)
  *B29C 65/06* (2006.01)
  *B29C 65/08* (2006.01)
  *B29C 65/16* (2006.01)
  *B29L 31/24* (2006.01)
  *B29C 65/00* (2006.01)

(52) U.S. Cl.
  CPC .......... *B23K 26/20* (2013.01); *F16L 27/0849* (2013.01); *F16L 37/0985* (2013.01); *F16L 47/02* (2013.01); *F16L 47/18* (2013.01); *B29C 65/06* (2013.01); *B29C 65/08* (2013.01); *B29C 65/16* (2013.01); *B29C 66/1248* (2013.01); *B29C 66/5223* (2013.01); *B29C 66/52231* (2013.01); *B29C 66/543* (2013.01); *B29L 2031/243* (2013.01); *F16L 2201/60* (2013.01)

(58) Field of Classification Search
  CPC ......... B29C 65/16; B29C 65/06; B29C 65/08; F16L 27/0849; F16L 47/02; F16L 47/18; F16L 37/0985; F16L 2201/60; B23K 26/20; B23K 20/129; B23K 20/10; B23K 20/002; B29L 2031/243
  See application file for complete search history.

(56) References Cited

U.S. PATENT DOCUMENTS

| | | | | |
|---|---|---|---|---|
| 2,479,580 A | | 5/1949 | Marco | |
| 2,554,514 A | * | 5/1951 | Wright | F16L 27/0861 285/147.1 |
| 2,592,904 A | * | 4/1952 | Jackson | B01F 5/0218 261/124 |
| 3,209,306 A | * | 9/1965 | Grieshaber | H01R 13/595 439/473 |
| 3,668,893 A | * | 6/1972 | Schmid | F16D 3/2245 464/122 |
| 3,769,117 A | * | 10/1973 | Bowen | B29C 66/93451 156/69 |
| 3,851,980 A | * | 12/1974 | Worth | F16B 7/0446 108/159 |
| 3,931,992 A | * | 1/1976 | Coel | F16L 27/073 285/271 |
| 4,415,291 A | * | 11/1983 | Smith | F16C 11/0619 403/36 |
| 4,448,562 A | * | 5/1984 | Rose | F16C 11/0671 277/635 |
| 4,463,475 A | * | 8/1984 | Rivers | E05D 5/02 16/241 |
| 4,466,755 A | * | 8/1984 | Smith | F16C 11/0604 403/138 |
| 4,527,803 A | * | 7/1985 | Rose | F16C 11/0671 277/315 |
| 5,156,420 A | | 10/1992 | Bokor et al. | |
| 5,285,864 A | * | 2/1994 | Martin | B62D 3/12 180/417 |
| 5,499,882 A | * | 3/1996 | Waterhouse | A47B 13/02 285/181 |
| 6,203,071 B1 | * | 3/2001 | Kingsford | F16L 43/008 285/18 |
| 2008/0122221 A1 | * | 5/2008 | Bridgewater | F16L 27/04 285/184 |
| 2014/0348572 A1 | * | 11/2014 | Matsuzawa | E04B 1/19 403/57 |
| 2015/0252569 A1 | * | 9/2015 | Warshaw | E04F 11/184 403/205 |
| 2017/0282309 A1 | * | 10/2017 | Olsson | B23K 37/0533 |

FOREIGN PATENT DOCUMENTS

| | | |
|---|---|---|
| DE | 202007017181 U1 | 2/2008 |
| DE | 10 2006 057 212 A1 | 6/2008 |
| DE | 202009000328 U1 | 3/2009 |
| DE | 102006030058 B4 | 9/2009 |
| DE | 102011100852 A1 | 12/2011 |
| EP | 0119782 A1 | 9/1984 |
| EP | 0382971 A1 | 8/1990 |
| EP | 1927806 A1 | 6/2008 |
| EP | 2527702 A1 | 11/2012 |
| FR | 2185769 A1 | 1/1974 |
| FR | 2884584 A1 | 10/2006 |
| JP | 2005-299827 A | 10/2005 |
| JP | 2005299827 A | 10/2005 |
| JP | 4807564 B2 * | 12/2011 |
| WO | WO-8803007 A1 * | 5/1988 |

OTHER PUBLICATIONS

Machine translation of JP-2005-299827A (no date available).*
Japan Intellectual Property Office, Office Action for Japanese patent application No. 201510172016.5, dated Jan. 3, 2018, 6 total pages.
German Patent Office, Office Action for German patent application No. 10 2014 105 165.3, dated Jun. 29, 2016, 4 total pages.
German Patent and Trade Mark Office, Extended European Search Report for European Application No. 15162602.5, dated Jul. 2, 2015, pp. 1-8.
German Patent and Trade Mark Office, Office action for Application No. DE 10 2014 105 165.3, dated Feb. 9, 2015, 6 pages.
Japan Intellectual Property Office, Office Action for Japanese patent application No. 2015-077380, dated Jan. 31, 2017, 9 total pages.
Unknown, Japanese Patent Application entitled "Adjustable Joint", Application No. H2-405761 (Unexamined Utility Model Specification No. H4-93591 U) filed Dec. 28, 1990, 9 total pages.
Unknown, Japanese Patent Application entitled "Joint for Piping", Application No. 1977-047452 (Unexamined Publication No. JP 53-141523 U), Published in 1978, 10 total pages.

* cited by examiner

METHOD FOR THE MANUFACTURE OF A PLUG-IN CONNECTOR, AND PLUG-IN CONNECTOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from German Application No.: DE 10 2014 105 165.3 filed on Apr. 11, 2014, entitled "METHOD FOR THE MANUFACTURE OF A PLUG-IN CONNECTOR, AND PLUG-IN CONNECTOR".

BACKGROUND

The invention relates to a method for producing a plug-in connector. The invention further relates to a plug-in connector comprising a first tubular component and a second tubular component, and also a first connection geometry and a second connection geometry, wherein the first connection geometry is arranged in a first connection plane, and wherein the second connection geometry is arranged in the first connection plane.

Plug-in connectors are used, for example, to connect a hose or the like to a tank or a pipeline. For this purpose, for example, a connector piece with a locking device can be provided at one end of the plug-in connector. At another end of the plug-in connector, an attachment piece for a hose can be provided, for example in the shape of a Christmas tree with a plurality of projections.

A plug-in connector of this kind with a one-piece body is known from DE 10 2006 030 058 B4, for example. The production is usually by plastic injection moulding using a tool prepared for a special shape of the plug-in connector. FIG. 1 of DE 10 2006 030 058 B4 shows, for example, a plug-in connector in which a first longitudinal axis of the connector piece extends perpendicularly with respect to a second longitudinal axis of the attachment piece. The plug-in connector thus bends through 90°.

However, if another relative angle between the first longitudinal axis and the second longitudinal axis is needed (for example any desired angle between 0 and 90°), a specific new tool is needed for each relative angle, the production of which tool is relatively time-consuming and expensive. Attachment pieces of this kind can therefore be produced cost-effectively only for standard relative angles and/or in large batch numbers.

The object of the invention is therefore to make the production of a plug-in connector more flexible and more cost-effective.

According to the invention, this object is achieved by a method for producing a plug-in connector, which plug-in connector comprises a first tubular component and a second tubular component, and also a first connection geometry and a second connection geometry, wherein the first connection geometry is arranged in a first connection plane, wherein the second connection geometry is arranged in the first connection plane, and wherein the first connection plane is inclined with respect to a first longitudinal axis of the first component, and wherein the first connection plane is inclined with respect to a second longitudinal axis of the second component, and wherein a relative angle between the first longitudinal axis and the second longitudinal axis can be modified by rotating the first component with respect to the second component, said method comprising the following steps:

selecting a relative angle between the first longitudinal axis and the second longitudinal axis by rotating the first component with respect to the second component, integrally bonding the first connection geometry to the second connection geometry at the selected relative angle.

Thus, according to the invention, a first tubular component and a second tubular component are first made available which, for example, can be produced individually by injection moulding. Here and in the text below, for the sake of simplicity, the first tubular component and the second tubular component are referred to as first component and second component. The tubular components do not necessarily need to have a circular cross section here, and instead the cross section can also be of any other shape, for example oval, square or polygonal. Furthermore, the shape and size of the cross section of the tube can change along the length of the tubular components.

The plug-in connector moreover has a first connection geometry and a second connection geometry, which are arranged in a common first connection plane. The first connection geometry and the second connection geometry can each be inclined with respect to both longitudinal axes of the first and second component, respectively. In the simplest case, therefore, each of the tubular components has one of the connection geometries at one end. A respective connection geometry can, for example, be arranged circumferentially on an axial end of one of the components. Normally, one of the connection geometries initially engages in the other connection geometry with a form fit, before a final connection is made between the connection geometries. By virtue of the fact that the first connection plane is inclined with respect to both longitudinal axes of the two components, a change of the relative angle between the first longitudinal axis and the second longitudinal axis takes place by rotating the first component with respect to the second component. Thus, by a relative rotation of the first component with respect to the second component, a relative angle between the first longitudinal axis and the second longitudinal axis can be set. The relative angles that are possible here depends above all on the angle at which the connection plane is inclined with respect to the two longitudinal axes. If the connection plane, for example, is inclined by 45° relative to the two longitudinal axes, all relative angles between 0 and 90° can be set by rotating the first component with respect to the second component. However, the first connection geometry and the second connection geometry do not necessarily also have to be arranged in the first component or the second component.

As soon as the desired relative angle is selected, an integrally bonded connection of the first connection geometry to the second connection geometry then takes place. As regards the size of the relative angle, it will be made clear that the first longitudinal axis and the second longitudinal axis do not necessarily have to intersect in each rotation position. Instead, however, an axis parallel to the first longitudinal axis can always be found which intersects the second longitudinal axis, such that a relative angle can also always be defined between first longitudinal axis and second longitudinal axis. However, it is also possible that the first longitudinal axis and the second longitudinal axis always intersect at the same point independently of the rotation position of the two components.

With a method of this kind, it is now possible to produce plug-in connectors with any desired bend angles, wherein in the simplest case only one injection moulding tool is needed for the first and the second component, respectively. Thus, plug-in connectors with any desired relative angles between the two longitudinal axes can be produced cost-effectively, and without additional delay for the production of new tools.

A method of this kind also permits a modular construction in which a large number of different plug-in connectors can be produced from the same basic components. This leads to greater flexibility in production and at the same time reduces the production costs, especially in the case of small batch numbers.

Preferably, the first connection geometry is arranged in an intermediate component which is rotatable with respect to the first component and/or the second component prior to the integrally bonded connection of the first connection geometry to the second connection geometry. For example, the intermediate component can here be in the form of a cylindrical tube section. The first connection geometry is then arranged in the intermediate component, while the second connection geometry is arranged, for example, at an axial end of the first or second component. Prior to the integrally bonded connection of the first connection geometry to the second connection geometry, the intermediate component can be rotatable with respect to the first or second component or with respect to both components. It is also possible that the intermediate component is from the outset connected in a rotationally fixed manner to the first component or the second component, in particular locked, and the second connection geometry is arranged in the component that is not connected in a rotationally fixed manner to the intermediate component. Such an intermediate component makes it possible to add further functionalities to the plug-in connector, and, particularly if the intermediate component is designed as a separate component, it is not even necessary for a tool for the production of the first component or the second component to be adapted. Rather, a modular construction is conceivable in which plug-in connectors with intermediate component or without intermediate component can be produced with the same tools for the production of the first tubular component and the second tubular component.

It is advantageous if the plug-in connector has a third connection geometry and a fourth connection geometry, wherein the third connection geometry and the fourth connection geometry are arranged in a second connection plane. Such an approach is particularly advantageous if an intermediate component is used. In this case, the third connection geometry and the fourth connection geometry can be used, for example, to connect the intermediate component to the second component, while the first or the second connection geometry is used to connect the intermediate component to the first component. In this case, it is also ensured that the intermediate component is initially rotatable with respect to the first component and the second component and thus, for example, a fluid outlet or the like arranged in the intermediate component can be fixed in any desired rotation position. Moreover, in this case, a connection plane is not to be understood as a mathematical plane but instead as a flat area with a certain spatial thickness.

Preferably, the second connection plane extends parallel to the first connection plane independently of the relative angle between the first longitudinal axis and the second longitudinal axis. This can be achieved, for example, if the intermediate component is cylindrical and has a connection geometry at each end. One of these connection geometries then preferably engages in a respective connection geometry of the first component and the second component. However, it is also conceivable that the first connection plane and the second connection plane do not extend parallel to each other, as a result of which, depending on the embodiment, it is possible to achieve angle ranges of greater than 0 to 90° between the first longitudinal axis and the second longitudinal axis.

It is advantageous if, after the selection of the relative angle between the first longitudinal axis and the second longitudinal axis, the third connection geometry is integrally bonded to the fourth connection geometry. However, it is also conceivable that the third connection geometry and the fourth connection geometry form a locked connection, for example, or that the third connection geometry and the fourth connection geometry are connected by integral bonding prior to the selection of the relative angle.

It is advantageous if at least one integrally bonded connection takes place by friction welding and/or ultrasonic welding and/or hot gas welding and/or laser welding. In this case, for example, one of the connection geometries can have a circumferential, wedge-shaped projection, which engages in a circumferential wedge-shaped recess of another connection geometry. It is preferable if the wedge-shaped connecting projection is larger than the wedge-shaped recess, such that a limited amount of excess material can flow radially inward and radially outward for example, in order to improve the leaktightness of the integrally bonded connection. One or more circumferential edges can also preferably be provided here in order to prevent excess material from reaching a radial outer side or a radial inner side of the first component, the second component or the intermediate component.

Preferably, the plug-in connector has at least one projection arranged on an outer side of the plug-in connector, wherein the projection extends perpendicularly with respect to the first connection plane. It is particularly preferable if at least one such projection is arranged respectively on the first component and on the second component. This permits a very simple check of the selected relative angle between the first component and the second component. Preferably, the at least one projection on a radial outer side of the first component or of the second component is arranged adjacent to the first connection geometry or to the second connection geometry. The projection preferably extends perpendicularly with respect to the first connection plane, as a result of which the relative angle between the first longitudinal axis and the second longitudinal axis can be optimally controlled.

The abovementioned object is also achieved by a plug-in connector that is produced by a method according to one of claims 1 to 7.

The abovementioned object is furthermore achieved by a plug-in connector which is of the type mentioned in the introduction and which is characterized in that the first connection plane is inclined with respect to a first longitudinal axis of the first component, wherein the first connection plane is inclined with respect to a second longitudinal axis of the second component, and wherein the first connection geometry is integrally bonded to the second connection geometry.

Such a plug-in connector therefore has a first connection plane that is inclined both with respect to a first longitudinal axis of the first component and also with respect to a second longitudinal axis of the second component. Both the first connection geometry and also the second connection geometry are arranged in the first connection plane. Within the meaning of the invention, a connection plane is not to be understood as an exact two-dimensional mathematical plane, but instead as a flat area with a certain spatial thickness. Although the first connection geometry and the second connection geometry are integrally bonded in the finished plug-in connector (for example by friction welding or ultrasonic welding), they can nevertheless usually be identified by at least one circumferential radial widening in the area of the first connection geometry and of the second connection geometry.

The same applies in respect of any third connection geometry and fourth connection geometry.

A plug-in connector of this kind can thus be produced with a modular construction in which the same first and second tubular components are used for a large number of different plug-in connectors. This reduces the production costs and increases the flexibility of production.

Preferably, the first connection geometry is arranged in an intermediate component, wherein the second connection geometry is arranged in the first component or in the second component. Such an intermediate component allows additional functions to be added to the plug-in connector, without the first component or the second component (and in particular the tools for producing these) having to be modified. The intermediate component can be provided as a substantially cylindrical tubular section and can have, at both axial ends, respective connection geometries that are each connected to a connection geometry of the first component and to a connection geometry of the second component. Alternatively, the intermediate component can also be connected to the first component or the second component by a locking connection. This has the advantage that usually only one integrally bonded connection has to be carried out by friction welding or ultrasonic welding. However, in this case, it is at the same time necessary that the first component or the second component is modified in order, for example, to permit a locked connection with the intermediate component.

It is advantageous if the intermediate component comprises a secondary attachment. In this case, for example, the intermediate part thus permits an additional branching in the fluid path. Alternatively, the secondary attachment can also be used to insert a measuring probe, for example, into the plug-in connector.

It is advantageous if a valve is arranged in the intermediate component. Such an embodiment allows a valve functionality to be further added to the plug-in connector. For this purpose, only a tool for producing the intermediate component has to be adapted; by contrast, the tools for producing the first component and the second component do not have to be modified. Thus, a relatively specific shape of the plug-in connector, with any desired relative angles between the longitudinal axes of the first component and of the second component, can also be produced without this incurring excessively high cost.

It is also preferable if a heating element is arranged in the intermediate component and/or a heating line is routed into the plug-in connector through a heating line attachment arranged in the intermediate component. Such an embodiment is particularly advantageous if the plug-in connector is used for a fluid line that conveys a fluid with a relatively high freezing point. This applies especially to the urea lines which are often used in the automobile sector and which in many cases comprise a heating element or a heating line.

It is also advantageous if the first connection geometry and the second connection geometry each extend in a circular shape in the first connection plane. With such a configuration, it is very easy to ensure that the first connection geometry and the second connection geometry can be connected at each desired relative angle between first longitudinal axis and second longitudinal axis. At the same time, such a configuration also permits the integrally bonded connection of the first connection geometry and the second connection geometry by means of friction welding. It will also be noted here that the first connection plane is not to be understood as an exact mathematical plane, but instead also has a certain spatial thickness in which the first connection geometry and the second connection geometry here extend.

It is advantageous if the first longitudinal axis and the second longitudinal axis intersect at a geometric centre point of the first connection geometry and of the second connection geometry. In this embodiment, it is ensured that the first longitudinal axis and the second longitudinal axis always intersect at the same point independently of the relative rotation position of the first component and of the second component. This has the advantage that, particularly in the 0° rotation position between the first component and the second component, a possibly undesired axial offset between the longitudinal axes does not occur. In this case, it is thus possible that the first longitudinal axis and the second longitudinal axis lie exactly on each other in the 0° rotation position between the first component and the second component.

It is also preferable if the first component and/or the second component has a radial widening at one end. By means of such a radial widening, the shape and position of the connection geometries can be adapted. For example, it is possible to ensure that the first longitudinal axis and the second longitudinal axis intersect at a geometric centre point of the first connection geometry and of the second connection geometry independently of the relative angle between the first longitudinal axis and the second longitudinal axis. The radial widening preferably has the shape of a spherical shell cutout. It is preferable if the plug-in connector has at least one projection arranged on an outer side of the plug-in connector, wherein in particular the projection extends perpendicularly with respect to the first connection plane. It is particularly preferable here if the plug-in connector has, on the first component and on the second component, at least one projection which is arranged on an outer side and which in each case extends perpendicularly with respect to the first connection plane. Moreover, the first component and the second component can each preferably have two such projections, wherein the projections are then preferably arranged, offset in each case by 180°, on an outer side of the first component and on an outer side of the second component. These projections permit very easy control of the relative angle between the first longitudinal axis and the second longitudinal axis during the production process.

The invention is described in more detail below on the basis of preferred embodiments and with reference to the drawings.

DETAILED DESCRIPTION

Figure 1:
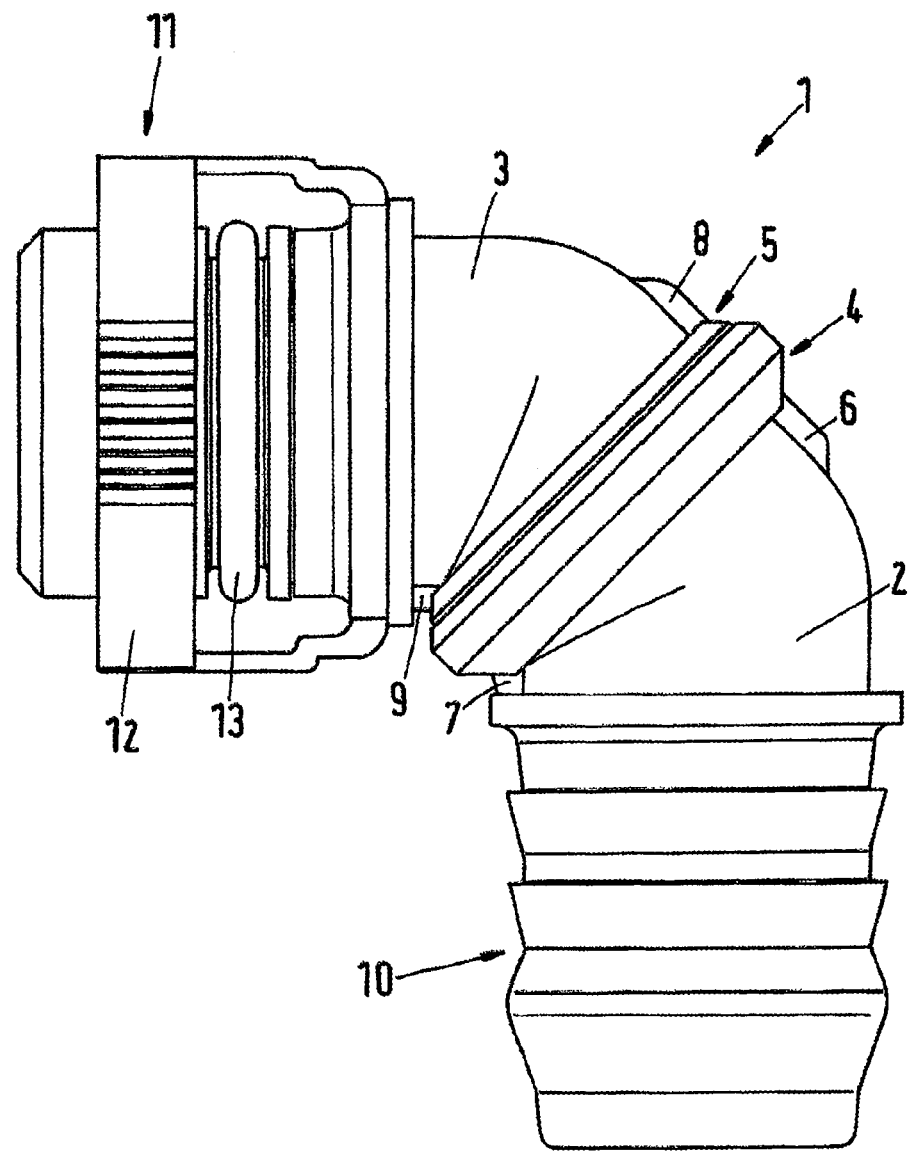
FIG. 1 shows a side view of a first embodiment of a plug-in connector according to the invention.

FIG. 1 shows a first embodiment of a plug-in connector 1 according to the invention, which has a first tubular component 2 and a second tubular component 3. In this embodiment, a first connection geometry 4 is arranged at one end of the first component 2. At the same time, a second connection geometry 5 is arranged at one end of the second component 3. The first connection geometry 4 here partially engages around the second connection geometry 5 radially from the outside.

The first component 2 moreover has projections 6,7, which are arranged on a radial outer side of the component 2. Correspondingly, the second component 3 comprises projections 8, 9, which are likewise arranged on a radial outer side of the second component 3. The projections 6 to 9 here are particularly advantageous for the production method, since they firstly permit a controlled adjustment of the relative angle between a first longitudinal axis and a second longitudinal axis (see also FIG. 2). The projections 7, 9 have the further advantage that local weak points of the injection moulding tools for producing the first component and the second component can be avoided. Without the projections 7, 9, the tools would have to be made very thin at these points, which would promote early wear.

In the present embodiment, the second component 2 has an attachment piece 10 in the form of a Christmas tree attachment. By contrast, the second component 3 has a connector piece 11 with a locking device 12, and sealing rings 13.

Figure 2:
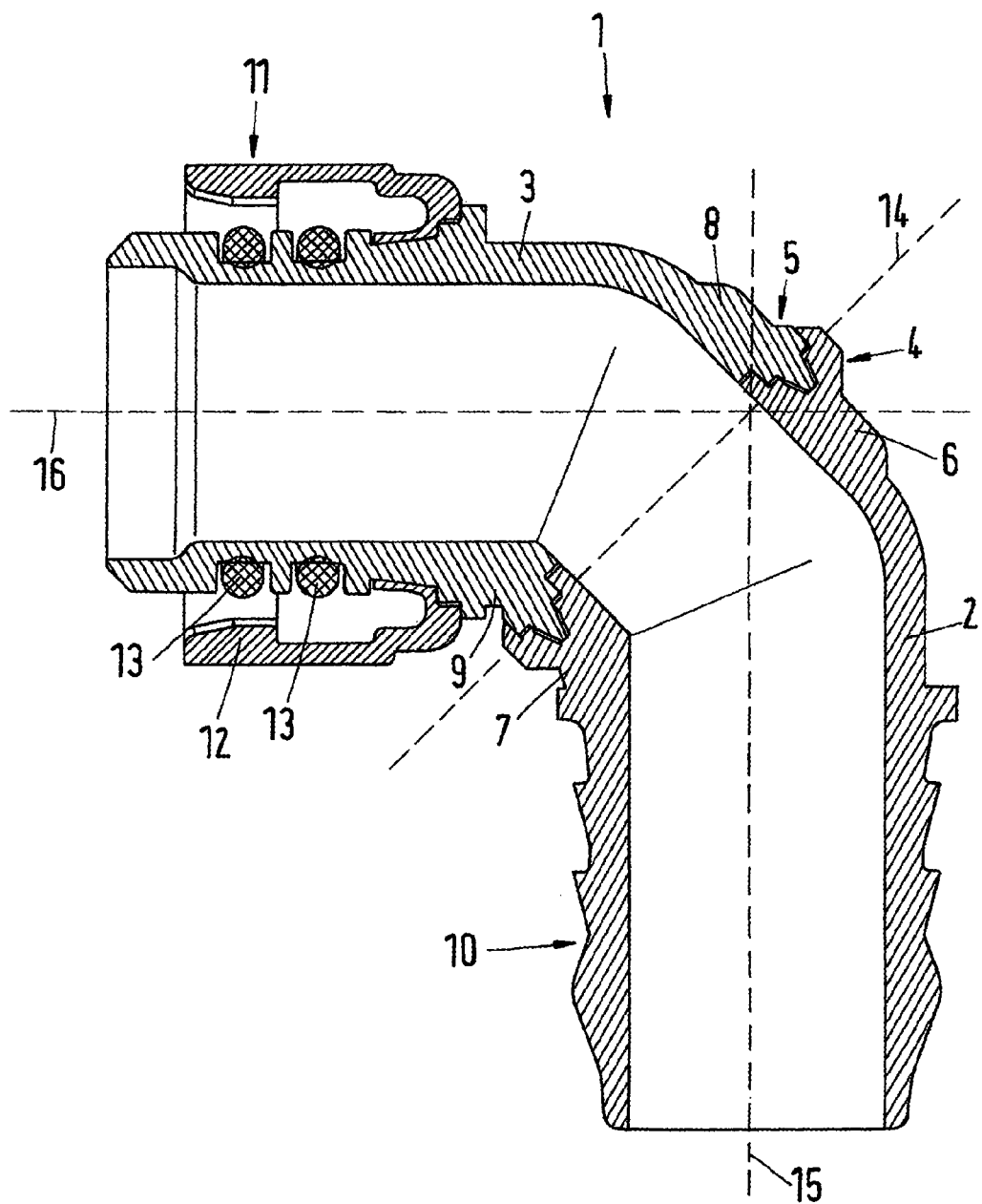
FIG. 2 shows a sectional view of the plug-in connector according to FIG. 1.

FIG. 2 shows a sectional view of the plug-in connector 1 according to FIG. 1. The first connection geometry 4 and the second connection geometry 5 are arranged in or parallel to a first connection plane 14. The first component 2 has a first longitudinal axis 15, which is inclined with respect to the first connection plane 14. Accordingly, the second component 3 has a second longitudinal axis 16, which is also inclined with respect to the first connection plane 14.

Figure 3:
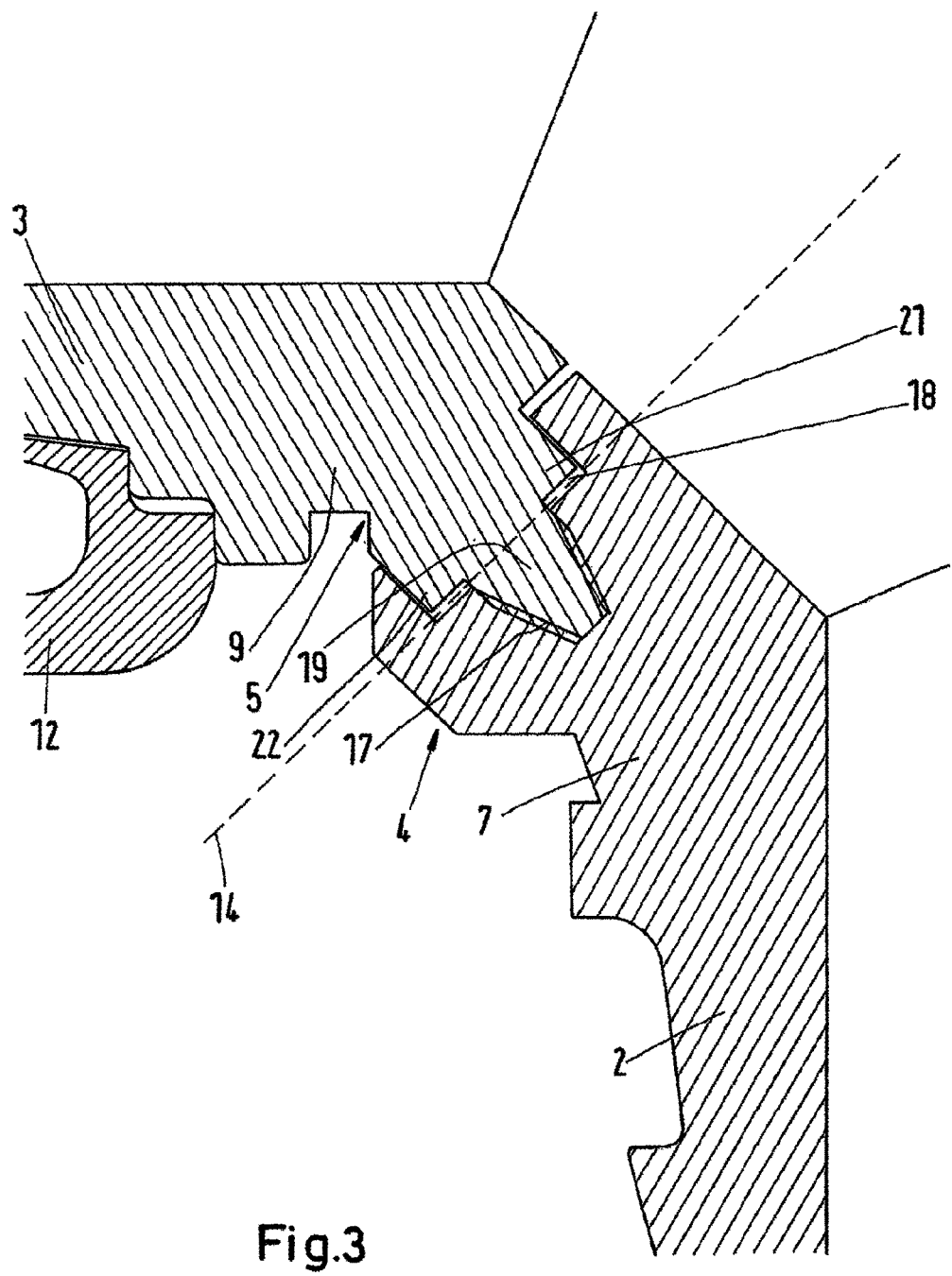
FIG. 3 shows a detail of the sectional view according to FIG. 2, FIG. 4A-4E show plug-in connectors according to the invention corresponding to the embodiment according to FIGS. 1 to 3, at different relative angles between the first and second longitudinal axes.
Figure 4A:
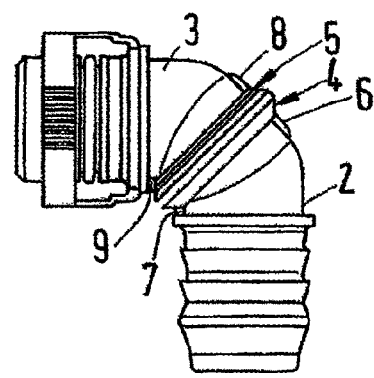
Figure 4B:
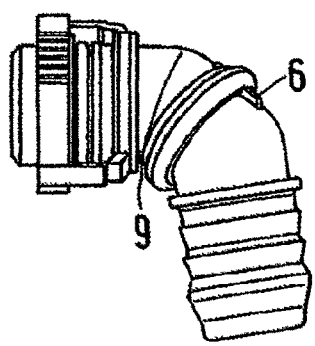
Figure 4C:
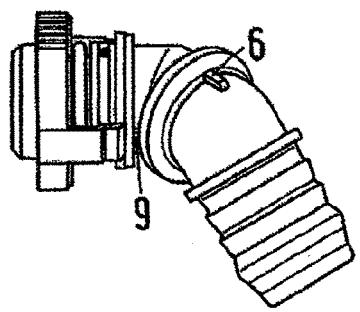
Figure 4D:
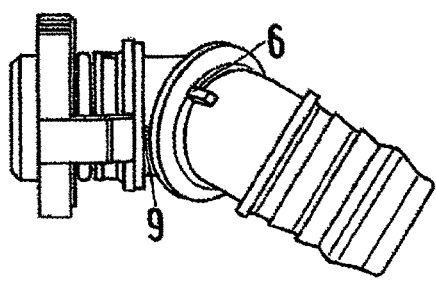
Figure 4E:
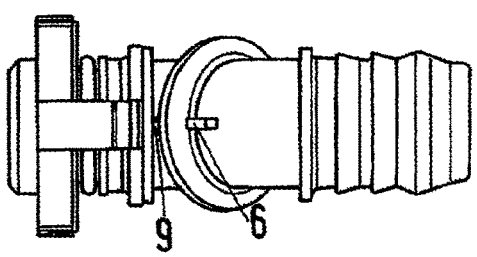

FIG. 3 shows a detail of the first connection geometry 4 and of the second connection geometry 5 according to the embodiment shown in FIG. 2. The first connection geometry 4 here comprises a wedge-shaped recess 17. The wedge-shaped recess 17 here extends circumferentially parallel to the first connection plane 14. The first connection geometry 4 moreover comprises a rectangular recess 18, which likewise extends circumferentially parallel to the first connection plane 14. The wedge-shaped recess 17 adjoins the rectangular recess 18 within the first connection geometry 4. Here, rectangular and wedge-shaped refer respectively to a rectangular and a wedge-shaped cross section of the recesses 17, 18.

The second connection geometry 5 comprises a wedge-shaped connecting projection 19, which extends circumferentially and parallel to the first connection plane 14. The second connection geometry 5 moreover has a rectangular connecting projection 20, which extends circumferentially and parallel to the first connection plane 14. The rectangular connecting projection 20 has two circumferential shoulders 21, 22. One circumferential shoulder 21 is arranged on a radial inner side of the rectangular connecting projection 20, and one circumferential shoulder 22 is arranged on a radial outer side of the rectangular connecting projection 20. Here too, the terms rectangular and wedge-shaped refer respectively to the cross section of the projections.

The wedge-shaped connecting projection 19 here engages in the wedge-shaped recess 17, wherein the wedge-shaped connecting projection 19 has a greater cross section than the wedge-shaped recess 17. Excess material is thus available which, for example, can flow into the rectangular recess 18 during a welding operation for fixing the relative angle position between the two longitudinal axes 15, 16. The excess material can in particular also permit an at least partial integrally bonded connection between the rectangular connecting projection 20 and the rectangular recess 18 and thus make the connection between the first component 2 and the second component 3 more stable and tighter. The shoulders 21, 22 ensure that large amounts of the material do not leave the connection geometries 4, 5 radially inwards or radially outwards and, for example, do not flow into the interior of the fluid line. FIGS. 2 and 3 thus show the plug-in connector 1 before an integrally bonded connection of the first component 2 to the second component 3 or of the first connection geometry to the second connection geometry.

FIGS. 4a to 4e show five different angle positions between the first longitudinal axis 15 of the first component 2 and the second longitudinal axis 16 of the second component 3, in a series of angles 90°, 67.5°, 45°, 22.5° and 0°. Of course, any other intermediate angle can also be chosen during the production process, by rotating the first component 2 with respect to the second component 3, and thereafter can be fixed by integrally bonding the first connection geometry 4 to the second connection geometry 5.

As can be seen from FIGS. 4a to 4e, the projections 6, 7 are also rotated with respect to the projections 8, 9 during a rotation of the first component 2 with respect to the second component 3. The projections 6 to 9 thus permit monitoring and control of the relative angle adopted between the first longitudinal axis 15 and the second longitudinal axis 16.

During the rotation of the first component 2 with respect to the second component 3, the relative angle between the first longitudinal axis 15 and the first connection plane 14 and the relative angle between the second longitudinal axis 16 and the first connection plane 14 remain constant at 45°.

Figure 5:
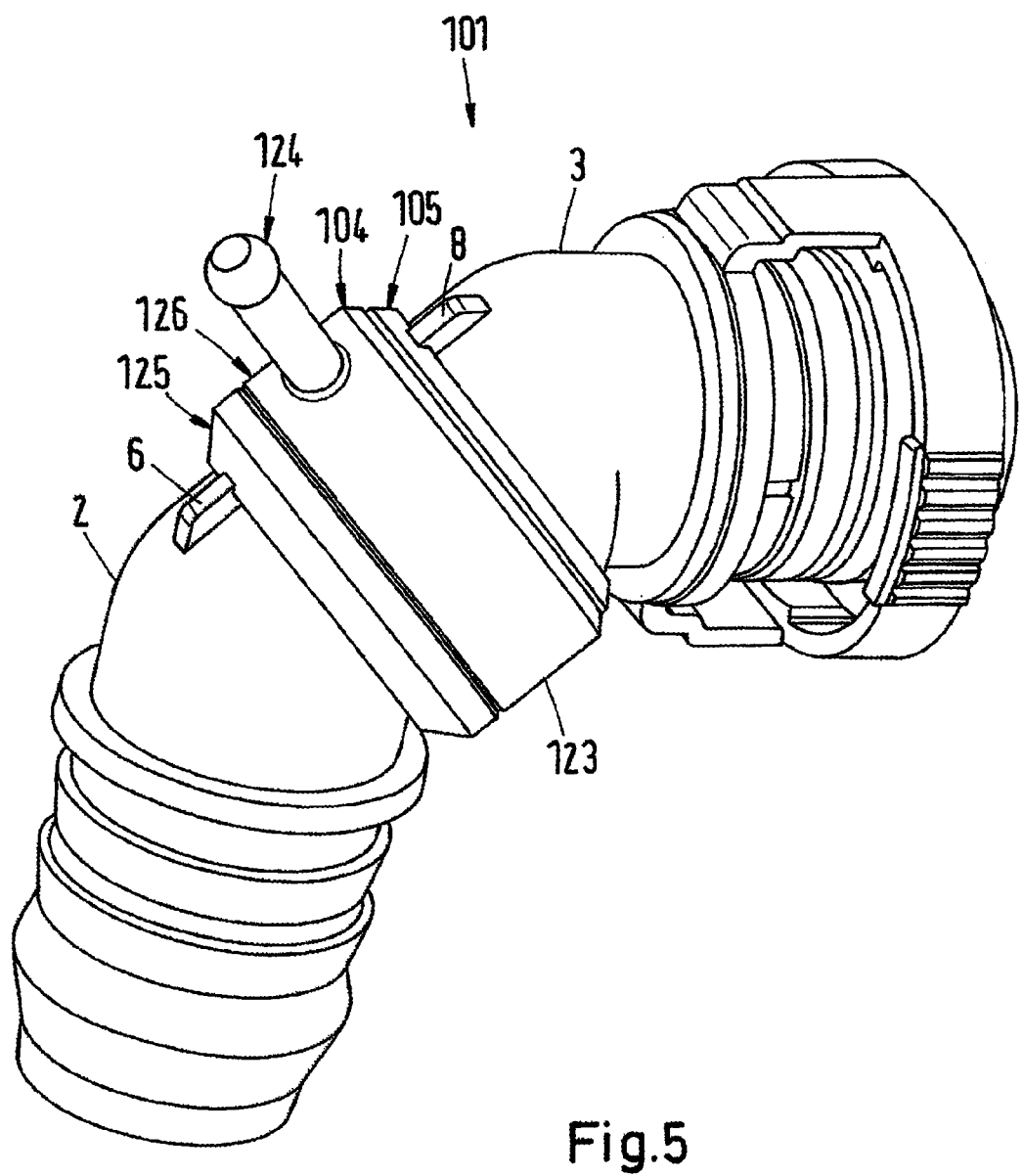
FIG. 5 shows a side view of a second embodiment of a plug-in connector according to the invention.

FIG. 5 shows a second embodiment of a plug-in connector 101 according to the invention.

FIG. 5 shows an outside view of the plug-in connector 101 with the first component 2 and the second component 3. Preferably, the first component 2 and the second component 3 are of identical construction to the first embodiment according to FIGS. 1 to 4e.

The plug-in connector 101 moreover comprises an intermediate component 123, which is arranged between the first component 2 and the second component 3. The intermediate component 123 is designed substantially as a cylindrical ring. In this embodiment, the intermediate component 123 comprises a secondary attachment 124. The secondary attachment 124 in this case makes it possible, for example, to remove fluid from the plug-in connector without the plug-in connector having to be detached from the fluid line. Moreover, it is possible, for example, to insert a probe in order to carry out a measurement inside the fluid line. However, other embodiments are also conceivable for the intermediate component 123. For example, the intermediate component 123 can also comprise a valve, or a heating element can be arranged in the intermediate component and/or a heating line can be routed into the plug-in connector through a heating element attachment arranged in the intermediate component.

In the present example, the plug-in connector 101 comprises, in addition to a first connection geometry 104 and a second connection geometry 105, also a third connection geometry 125 and a fourth connection geometry 126. The third connection geometry 125 and the first connection geometry 104 here correspond substantially to the embodiment of the first connection geometry 4 from the first embodiment of a plug-in connector 1 according to the invention. The second connection geometry 105 and the fourth connection geometry 126 here correspond substantially to the embodiment of the second connection geometry 5 from the first embodiment of the plug-in connector 1. In this case, however, the first connection geometry 104 is arranged in the intermediate component 123, wherein the second connection geometry 105 is arranged as before in the second component 3.

For the final fixing of a relative angle between the first longitudinal axis 15 of the first component 2 and the second longitudinal axis 16 of the second component 3, two integrally bonded connections are therefore needed here. On the one hand, the first connection geometry 104 has to be integrally bonded to the second connection geometry 105, for example by friction welding or ultrasonic welding, and, accordingly, an integrally bonded connection also has to be produced between the third connection geometry 125 and the fourth connection geometry 126. However, alternative embodiments are also conceivable in which only a first connection geometry 104 and a second connection geometry 105 are provided, and the intermediate component 123 is connected to the first component 2 or the second component 3, for example by a locking connection. Moreover, it is also conceivable for the intermediate component to be initially integrally bonded to the first component or the second component and, thereafter, to select the relative angle between first longitudinal axis and second longitudinal axis.

FIGS. 6 to 9 show a third embodiment of a plug-in connector 201 according to the invention.

Figure 6:
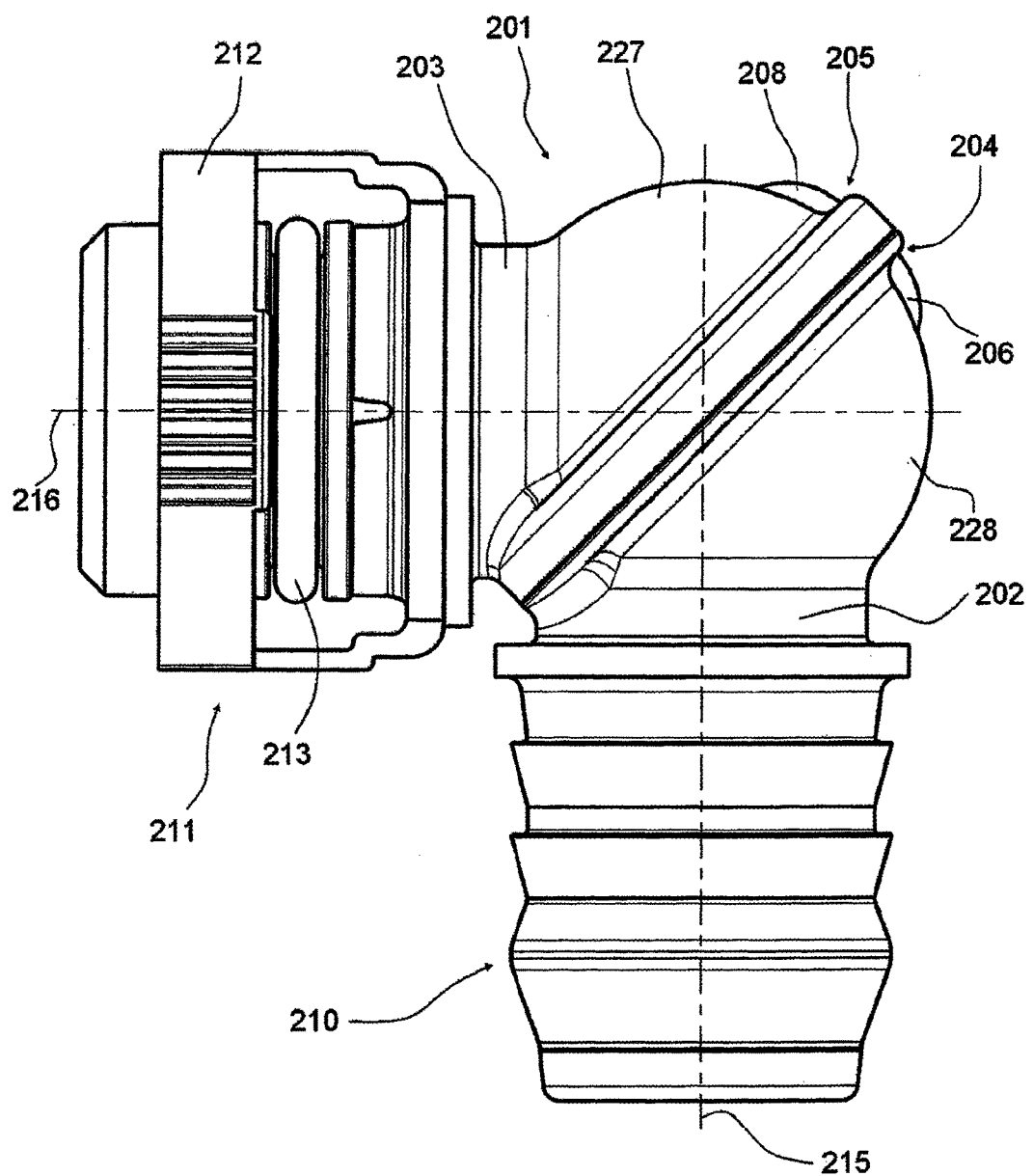
FIG. 6 shows a side view of a third embodiment of a plug-in connector according to the invention.

FIG. 6 first shows an outside view of the plug-in connector 201 with a first component 202 and a second component 203. A first connection geometry 204 is arranged at an axial end of the first tubular component 202, while a second connection geometry 205 is arranged at an axial end of the second component 203. In the area of the first connection geometry 204, a projection 206 is here arranged on an axial outer side of the first component 202. Correspondingly, a projection 208 is arranged on an axial outer side of the second component 203 in the area of the second connection geometry 205. The projections 206, 208 also have the advantage here that they permit a controlled adjustment of the relative angle between the first longitudinal axis 215 and the second longitudinal axis 216. Here too, the plug-in connector 201 has an attachment piece 210 and also a connector piece 211. The connector piece 211 comprises a locking device 212 and sealing rings 213.

The second component 203 here comprises a radial widening 227 at an axial end in the area of the second connection geometry 205. Accordingly, the first component 202 has a radial widening 228 at an axial end in the area of the first connection geometry 204.

The radial widenings 227, 228 here have the shape of spherical shell cutouts. The radial widenings 227, 228 make it possible to adapt the size of the connection geometries 204, 205 in relation to the cross section of the tubular components 202, 203. In particular, the intersection of the longitudinal axes 215, 216 can shift to the geometric centre point of the first connection geometry 204 and of the second connection geometry 205. It is thus possible to avoid an axial offset between the first longitudinal axis 215 and the second longitudinal axis 216 in the 0° rotation position of the plug-in connector. It is thereby possible to avoid any undesirable buckling in the plug-in connector.

Figure 7:
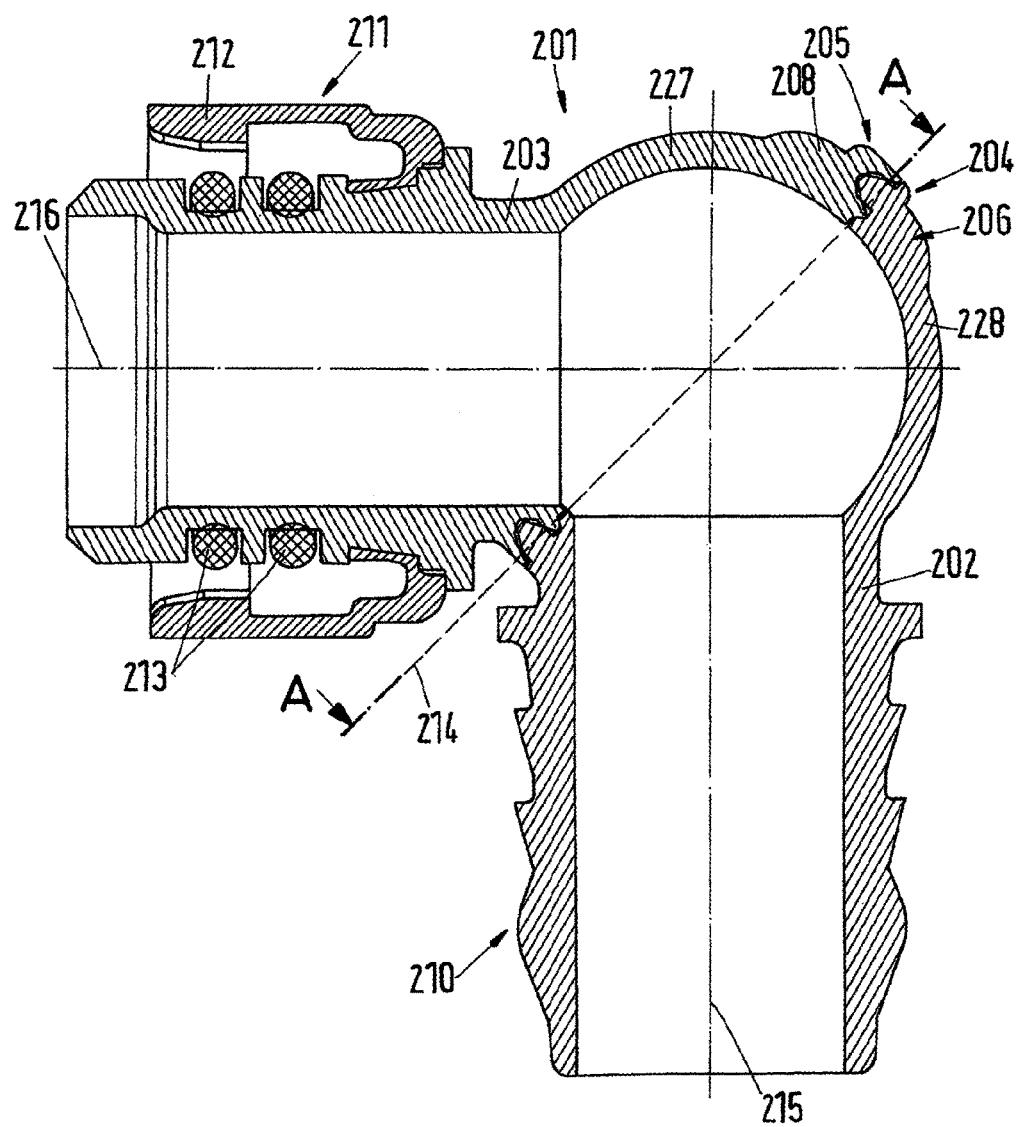
FIG. 7 shows a sectional view of the plug-in connector according to FIG. 6.

FIG. 7 now shows a sectional view of the plug-in connector 201 according to FIG. 6. The shape of the radial widenings 227, 228 can also be better seen in FIG. 7. At the same time, it will be seen that the intersection of the longitudinal axes 215, 216 now lies at the geometric centre point of the first connection geometry 204 and of the second connection geometry 205 within the first connection plane 214.

Figure 8:
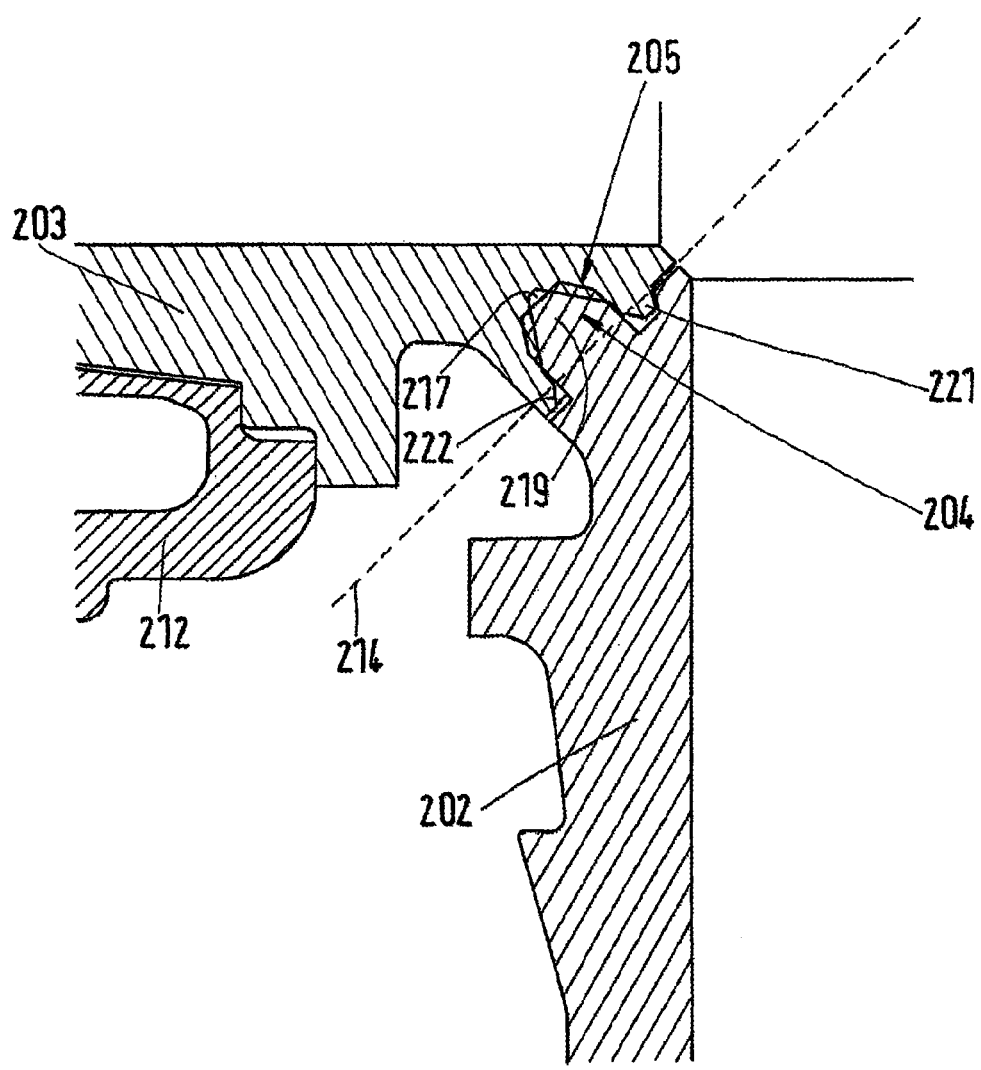
FIG. 8 shows a detail of the sectional view according to FIG. 7.

FIG. 8 shows a detail from FIG. 7. Here, the first connection geometry 204 and the second connection geometry 205 of the plug-in connector 201 can be seen in particular detail. Here too, the first connection geometry 204 has a wedge-shaped recess 217, which extends circumferentially and parallel to the first connection plane 214. Here too, wedge-shaped refers to a wedge-shaped cross section of the recess 217. The wedge-shaped recess 217 is in this case truncated, i.e. has a flat area at its deepest point.

The second connection geometry 205 comprises a wedge-shaped connecting projection 219, which likewise extends circumferentially and parallel to the first connection plane 214. The wedge-shaped connecting projection 219 is here strongly truncated and has an extended flat area at its tip. Here, the second connection geometry 205 comprises two circumferential shoulders 221, 222. One circumferential shoulder 222 is arranged on a radial inner side of the second connection geometry 205, while the other circumferential shoulder 222 is arranged on a radial outer side of the second connection geometry 205. Here too, the term wedge-shaped refers to the cross section of the connecting projection, although a strongly truncated wedge shape is used here.

The wedge-shaped connecting projection 219 engages in the wedge-shaped recess 217, although the wedge-shaped connecting projection 219 has a greater cross section than the wedge-shaped recess 217. Here, however, any other desired shapes of the recess and the connecting projection are possible, the aim simply being to ensure that the connecting projection has a greater cross section than the recess, so that excess material is available for a connecting operation. The excess material can then also permit an at least partial integral bond between the circumferential shoulders 221, 222 with the first connection geometry 204, as a result of which the tightness of the connection between the first component 202 and the second component 203 can be improved.

Figure 9:
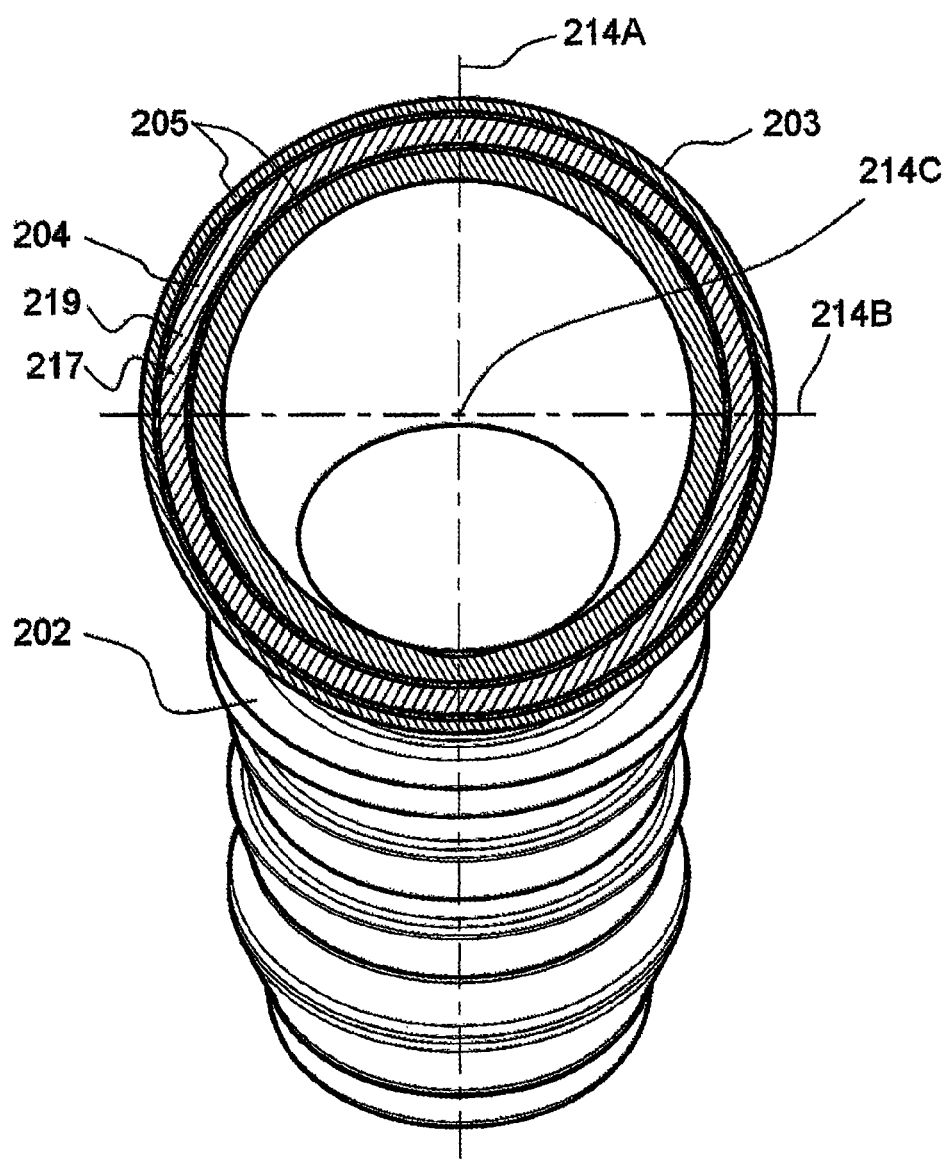
FIG. 9 shows a sectional view according to the section plane A from FIG. 7 through the first and the second connection geometries.

FIG. 9 shows a further sectional view of the plug-in connector 201. In this case, a sectional view has been chosen along the section plane A in FIG. 7, which corresponds to a section along the first connection plane 214. Here, it can once again clearly be seen that the first connection geometry 204 and the second connection geometry 205 here have a circular cross section within the first connection plane 214. The first connection plane 214 is symbolized here by the two axes 214A, 214B lying in the connection plane. The geometric centre point 214C of the first connection geometry 204 and of the second connection geometry 205 also lies at the intersection of the two axes 214A, 214B. In this embodiment, the first longitudinal axis 215 and the second longitudinal axis 216 also intersect at this geometric centre point 214C, independently of the adopted relative angle between first longitudinal axis 215 and second longitudinal axis 216.

Furthermore, it can be seen in detail in FIG. 9 how the first connection geometry 204 engages in the second connection geometry 205 with the wedge-shaped connecting projection 219 in the wedge-shaped recess 217.

Figure 10:
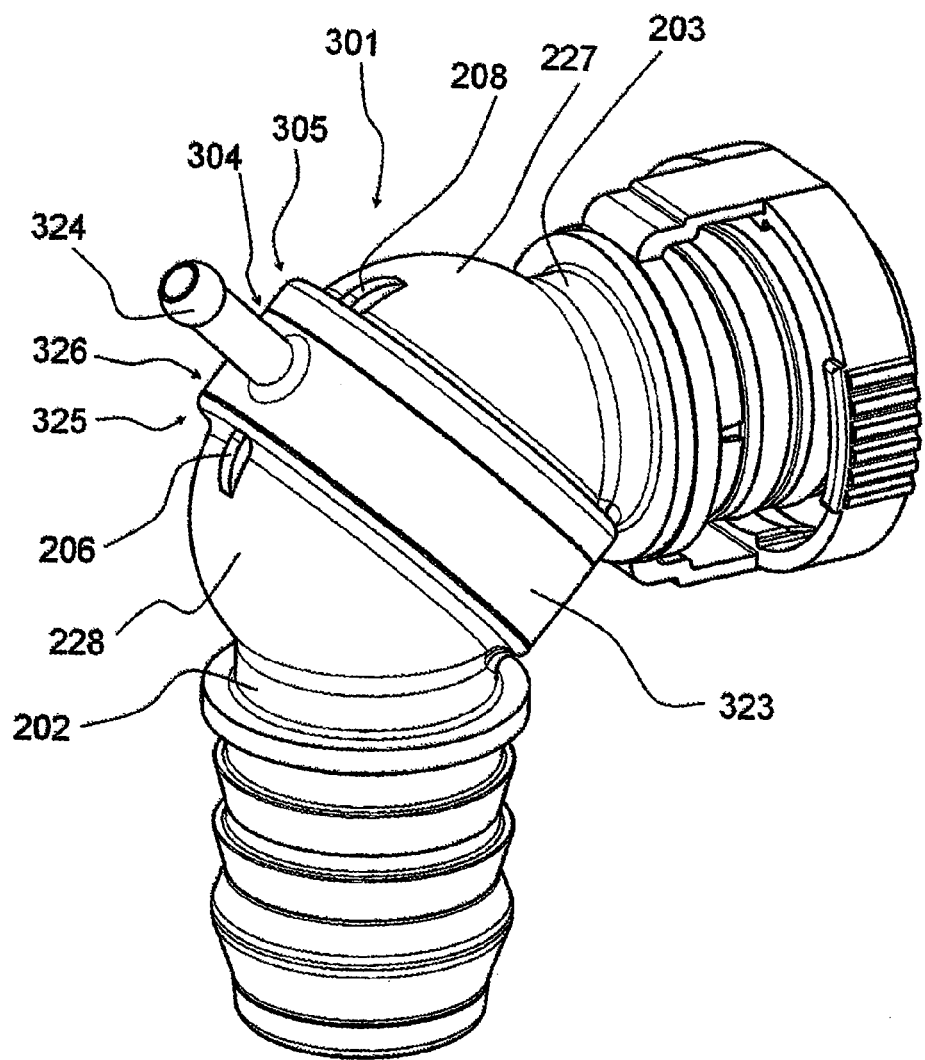
FIG. 10 shows a side view of a fourth embodiment of a plug-in connector according to the invention.
Figure 11:
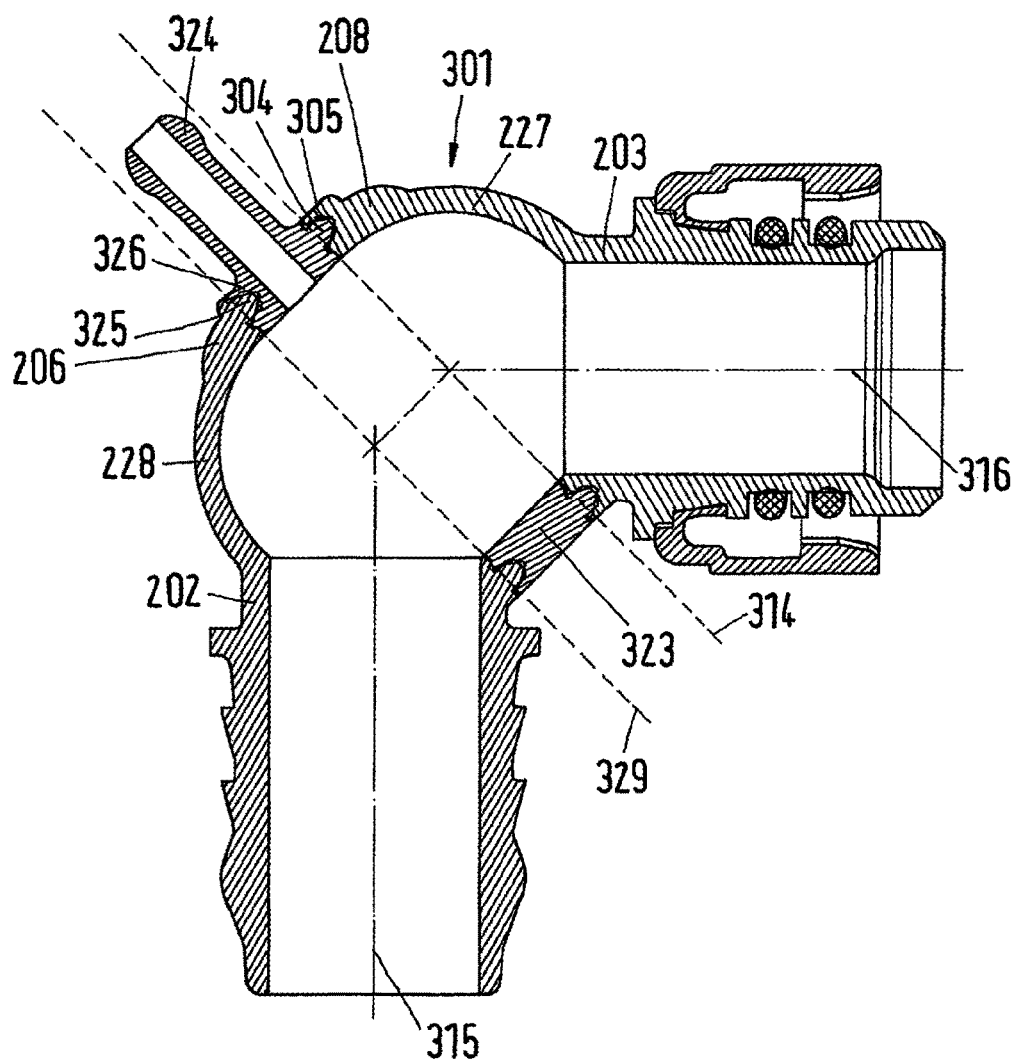
FIG. 11 shows a sectional view of the plug-in connector according to FIG. 10.

FIGS. 10 and 11 show a fourth embodiment of a plug-in connector according to the invention. Similarly to FIG. 5, the plug-in connector 301 has an additional intermediate component 323 between the first component 202 and the second component 203. The first component 202 and the second component 203 are here of identical construction to the third embodiment of the plug-in connector 201 according to the invention.

The plug-in connector 301 comprises a first connection geometry 304 which is arranged in the intermediate component 323. The second connection geometry 305 is arranged at an axial end of the second component 203. The first connection geometry 304 and the second connection geometry 305 extend in the first connection plane 314.

The plug-in connector 301 also has a third connection geometry 325 and a fourth connection geometry 326. The third connection geometry 325 is arranged at an axial end of the first component 202 and extends within a second connection plane 329. The third connection geometry 325 engages in the fourth connection geometry 326, wherein the fourth connection geometry 326 is arranged in the intermediate component 323. The fourth connection geometry 326 is likewise arranged in the second connection plane 329. The intermediate component 323 comprises a secondary attachment 324 which here, for example, permits the admission or removal of liquid or permits the insertion of a sensor into the fluid line.

Alternatively or in addition, a valve can also be arranged in the intermediate component. Such an embodiment then allows a plug-in connector to be equipped with an additional valve functionality, without having to adapt the basic components in the form of the first tubular component and the second tubular component.

Moreover, alternatively or in addition, a heating element could also be arranged in the intermediate component and/or a heating line could be routed into the plug-in connector through a heating element attachment arranged in the intermediate component. A solution of this kind would be particularly advantageous if a fluid with a relatively high freezing point is routed through the fluid line. This applies especially to the urea lines which are often used in the automobile sector and which in many cases comprise a heating line or a heating element.

A connection between the third connection geometry 325 and the fourth connection geometry 326 takes place here correspondingly to the connection between the first connection geometry 304 and the second connection geometry 305, i.e. in the form of an integrally bonded connection.

It is claimed:

1. A method for producing a plug-in connector, which plug-in connector comprises a first tubular component and a second tubular component, and also a first connection geometry and a second connection geometry, wherein the first connection geometry is arranged in a first connection plane, and wherein the second connection geometry is arranged in the first connection plane, and wherein the first connection plane is inclined with respect to a first longitudinal axis of the first tubular component, and wherein the first connection plane is inclined with respect to a second longitudinal axis of the second tubular component, and wherein a relative angle between the first longitudinal axis and the second longitudinal axis can be modified by rotating the first component with respect to the second component, said method comprising:
   selecting a relative angle between the first longitudinal axis and the second longitudinal axis by rotating the first component with respect to the second component;
   inserting a wedge-shaped connection projection of the second connection geometry into a circumferential, wedge-shaped recess of the first connection geometry; and
   integrally bonding the first connection geometry to the second connection geometry at the selected relative angle.

2. The method according to claim 1, characterized in that the first connection geometry is arranged in an intermediate component which is rotatable with respect to the first tubular component and/or the second tubular component before the integral bonding of the first connection geometry to the second connection geometry.

3. The method according to claim 1, characterized in that the plug-in connector comprises a third connection geometry and a fourth connection geometry, wherein the third connection geometry and the fourth connection geometry are arranged in a second connection plane.

4. The method according to claim 3, characterized in that the second connection plane extends parallel to the first connection plane, independently of the relative angle between the first longitudinal axis and the second longitudinal axis.

5. The method according to claim 3, characterized in that, after the relative angle between the first longitudinal axis and the second longitudinal axis has been selected, the third connection geometry is integrally bonded to the fourth connection geometry.

6. The method according to claim 1, characterized in that at least one integrally bonded connection is obtained by one of friction welding, ultrasonic welding hot gas welding, and laser welding.

7. The method according to claim 1, characterized in that the plug-in connector has at least one projection arranged on an outer side of the plug-in connector, wherein the at least one projection extends perpendicularly with respect to the first connection plane.

* * * * *